United States Patent

Seyfried et al.

[11] Patent Number: 6,103,132
[45] Date of Patent: Aug. 15, 2000

[54] FILTER CLOTH, FILTERING PROCESS, AND FILTERING DEVICE FOR LIQUID FILTRATION

[76] Inventors: Carl Franz Seyfried, Oestbergweg 3, 30559 Hannover (Kirchrode); Ulrich Grabbe, Berliner Weg 3, 31552 Rodenberg, both of Germany

[21] Appl. No.: 09/216,639

[22] Filed: Dec. 16, 1998

Related U.S. Application Data

[63] Continuation-in-part of application No. PCT/EP97/03215, Jun. 19, 1997.

[30] Foreign Application Priority Data

Jun. 19, 1996 [DE] Germany .................. 198 24 483

[51] Int. Cl.⁷ .................. B01D 37/00; B01D 33/50; B01D 29/68
[52] U.S. Cl. .................. 210/791; 210/780; 210/331; 210/332; 210/333.01; 210/391; 210/407; 210/411
[58] Field of Search .................. 210/784, 791, 210/402, 391, 407, 408, 409, 410, 330, 331, 332, 333.01; 55/290

[56] References Cited

U.S. PATENT DOCUMENTS

| | | | |
|---|---|---|---|
| 1,649,220 | 11/1927 | Goodloe | 55/290 |
| 1,833,315 | 11/1931 | Burhans . | |
| 4,167,482 | 9/1979 | Müller | 210/68 |
| 4,725,292 | 2/1988 | Williams | 55/290 |
| 5,560,835 | 10/1996 | Williams | 210/783 |
| 5,925,155 | 7/1999 | Rodgers | 210/402 |

FOREIGN PATENT DOCUMENTS 8103750   3/1983   Netherlands .

*Primary Examiner*—Robert J. Popovics
*Attorney, Agent, or Firm*—Alix, Yale & Ristas, LLP

[57] ABSTRACT

A filter cloth for liquid filtration is made as a long-pile fabric, the pile threads 21 of which lie on the flow side and are flattened against the supporting fabric during the filtration and form a deep filter. At the time of back washing they are straightened by the back washing and release the dirt particles. The back washing is performed preferably by means of a suction bar 13, which at the same time acts mechanically on the pile threads, in order to promote an abrupt straightening of the pile threads at the time of back washing and the flattening of the pile threads after the back washing.

8 Claims, 3 Drawing Sheets

FILTER CLOTH, FILTERING PROCESS, AND FILTERING DEVICE FOR LIQUID FILTRATION

CROSS-REFERENCE TO RELATED APPLICATIONS

This is a continuation-in-part application of International Application No. PCT/EP97/03215 filed Jun. 19, 1997.

BACKGROUND OF THE INVENTION

The present invention relates generally to liquid filtration by means of a filter cloth. In particular the present invention relates to the filtration of waste water which discharges from the final purification stage of a waste water purification plant.

Filtering devices for liquids operating with filter cloths are known in different designs, e.g. in the form of filter presses, disk filters (EP-B-0 413 178) or drum filters. The invention is applicable in the case of filtering devices of any design. The filter cloths used in such devices are single-layer fabrics which behave like a sieve, the holes of which are defined by the mesh of the fabric. However, as a rule filter cloths have a multi-layer structure comprising a supporting fabric with a relatively large mesh and a filter-active layer. In the filler-active layer the threads or filaments lie as multiple plies over one another. A deep or spatial filter of this type has angled and multiply curved flow channels within which solid particles, which are smaller than the free cross-section of the spaces between the threads, can be held back, partially by mechanical blocking in the flow channels and partially by adsorption on the walls thereof. Such a filter-active layer with a deep filter effect as a rule is made as a needle felt or tangled fiber fleece.

The flow resistance of such a filter cloth is relatively high and increases quickly with increasing blockage of the flow channels in the filter layer. Therefore the filter cloth must be cleaned at relatively short intervals. As a rule this is performed by back-rinsing, that is, by passing liquid, such as, e.g. fresh water or filtrate, back through the filter cloth in the direction opposite to the direction of filtering. If the side of the filter cloth against which the liquid flows in the filtering operation is designated as the front side and the other side as the back side, then the back washing flow necessary for back washing the filter cloth can be created by sucking liquid on the front side or supplying liquid under pressure on the back side of the filter cloth, or both. The back washing can be carried out on the entire surface of the filter cloth simultaneously or only on a partial area of the filter cloth, which is moved back and forth over the entire surface thereof. An example of a suction device movable over the filter cloth for back washing is described in the already mentioned EP-B-0 413 178.

Those solid particles, which are deposited on the outside of the filter cloth at the time of filtering and form a layer of the pre-coat layer type which supports the filter action, can easily be removed by back washing. However, those solid particles which are caught and blocked in the numerous narrow and angled flow channels of the filter-active layer of the filter cloth, produce considerable problems at the time of back washing. These problems are greater the more the layer has the nature of a deep filter. In the twisting flow channels of the filter-active layer no flow speed can be applied which is so great that the solid particles are completely released and washed away. Limits are set on the increase in the pressure or, as the case may be, on the flow speed since the filter cloth is damaged at too high a speed. The filter cloths known up to now where the effective filter-active layer is made as a deep filter, e.g. as needle felt or tangled thread fleece, cannot be cleaned without residue remaining therein. These become clogged so that they have to be replaced after a relatively short operating time.

More advantageous is the formation of the filter cloth as a so-called pile material, that is, a pad, plush, or velvet fabric, which consists of a relatively large-meshed supporting fabric and, for example, a pile made of pile threads worked into the W binding. In the filter operation the pile threads lie on the upstream side of the filter cloth and their length, stiffness, and thickness are selected so that the pile threads are shifted by the flowing liquid into a position approximately parallel to the supporting fabric. The pile threads lie in multiple layers or plies over one another and form a deep filter containing numerous narrow, angled, and multiply curved flow channels between the pile threads lying over one another. Solid particles, smaller than the unobstructed width of the flow channels, can be held therein partially mechanically and partially by adsorption. On the other hand, at the time of the back washing the pile threads are exposed to a liquid flow directed away from the supporting fabric and in this way are raised relative to the supporting fabric. Then they are largely parallel to one another and to the direction of flow, by which the volume of the pile layer is greatly enlarged and the flow channels existing between the pile threads are opened and leveled. By means of this, on the one hand, the flow resistance for the back washing liquid is reduced so that it can flow between the pile threads at a high rate, and on the other hand the solid particles mechanically blocked previously in the flow channels are released, so that they can be loosened and washed away by the back washing liquid, overcoming the adsorption forces.

Processes and devices for filtering liquids, with the use of a pile material as a filter medium and with the use of the previously described straightening effect at the time of back washing are known from FR-A-2 366 864 and NL-A-81 03 750. In the case of the process and the device in accordance with NL-A 81 03 750 it is known that the back washing which causes the straightening of the pile threads is created by means of a suction bar with a suction slit, which stands opposite the pile side of the filter cloth at a short distance and is moved parallel to this.

SUMMARY OF THE INVENTION

The object of the invention is to improve a process and a device for liquid filtration of the specified known type so that a more effective and more thorough cleaning of the filter cloth during back washing is made possible. This is achieved in accordance with the invention by means of the filtering process and the filtering device of the present invention.

In accordance with the invention it was found that it is advantageous to block the pile threads of the filter cloth by mechanical action of the suction bar from straightening up until they have reached the area of the suction slit and can straighten up abruptly in that area. In this way the loosening and releasing of the solid particles deposited in the pile layer of the filter cloth is promoted.

BRIEF DESCRIPTION OF THE DRAWINGS

The invention is explained in greater detail below by means of embodiments with reference to the drawings. Here.

DESCRIPTION OF A PREFERRED EMBODIMENT

Figure 1:
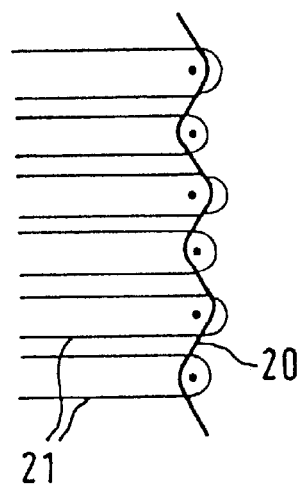
FIG. 1 shows a simplified schematic sectional representation of the fabric structure of a filter cloth in accordance with the invention.

The structure of the filter cloth in accordance with the invention, as shown very schematically and simplified in FIG. 1, consists of a supporting or base fabric 20 and pile threads 21 incorporated into the supporting fabric 20. The threads extend from the supporting fabric 20 to one side and form a pile of the filter cloth. The supporting fabric 20 is shown simplified with warp and weft threads. However, the expression "supporting fabric" also is to include flat textile articles which are not produced by weaving, but, e.g. by knitting or in a mixed technique. The mesh width or size of the supporting fabric 20 preferably is larger than the particle size of the solid particles to be filtered out of the liquid. The pile threads 21 are incorporated into the supporting fabric 20 in any way and manner known in the art.

Figure 3:
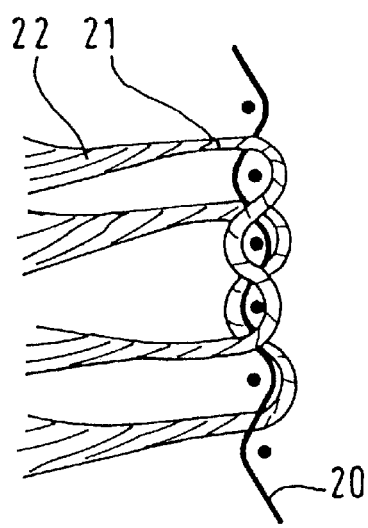
FIG. 3 shows a detail of the filter cloth in a magnified schematic representation.

Preferably both the supporting fabric and the pile threads consist of plastic filaments, the smooth surface of which promotes the purification. At least the pile threads 21 are multifilaments composed of monofilaments, which at least in the area of their free ends 22 can fan out into their individual filaments, as is shown schematically in FIG. 3. The threads of the supporting fabric 20 also can be multifilaments. Preferably polyamide or polyester are used as the material for the supporting fabric 20 and pile threads 21. The binding of the pile threads 21 to the supporting fabric 20 can be reinforced by partial welding, bonding and/or gluing.

Figure 2:
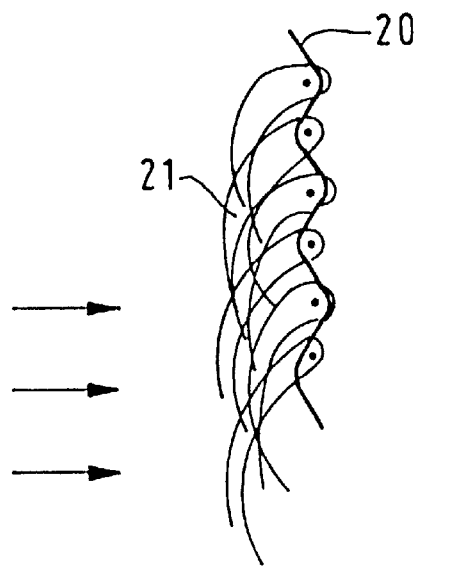
FIG. 2 shows the filter cloth during the filtering operation in a schematic representation similar to that of FIG. 1.

In the following description for the sake of simplicity the side of the filter cloth having the pile threads 21 (the left side in FIG. 1) is designated as front side and the other side as back side. During the filtering the filter cloth is used so that the liquid to be filtered flows toward and against its front side, that is, against the pile threads 21. The pile threads 21 are displaced, or as the case may be laid flat, in the direction toward the supporting fabric 20 by the arriving liquid to be filtered, so that they assume the position indicated schematically in FIG. 2, in which position adjacent pile threads 21 lie in several layers over one another and form a filtering layer of the type of a needle felt or tangled fiber fleece, that is, a deep filter, which forms numerous narrow, long, and angled flow channels. An appropriate choice of the length, stiffness, and density of the pile threads 21 is important for this desired behavior. These parameters are mutually dependent on one another, so that e.g. thicker, or as the case may be stiffer pile threads 21 require a greater length. The length of the pile threads 21 as a rule is at least 10 mm, preferably more than 12 mm. Shorter pile threads are either too stiff or do not produce the desired "layer density", or spatial depth of the filter-active layer in the filter operation in the position shown in FIG. 2.

At the time of back washing the filter cloth, wash water, e.g. fresh water or filtrate, is directed from the back side (right side in FIG. 1 and FIG. 2) through the filter cloth and at sufficient speed so that the displaced pile threads 21 are straightened and assume the position shown schematically in FIG. 1. In this case the angled channels disappear between the pile threads and make an area with a large free cross-section, by which the dirt particles are washed away without hindrance or redepositing. In the case of a sufficiently great flow rate of the back washing liquid, the turbulence of the back washing can even cause a flattening or "shaking out" of the pile threads, by means of which the release of the dirt particles also is promoted. Experiments have shown that a practically complete cleaning of the filter cloth can be achieved by back washing in this way, in particular when the meshes of the supporting fabric 20 are made so large that no solid particles can be found in the supporting fabric 20 itself.

There is no danger of a gradual loading of the filter cloth, because its filter-active layer formed by the pile threads can be cleaned completely at any time by the straightening effect and the volume increase at the time of the back washing. In the filter operation the filter performance of the filter cloths in accordance with the invention is completely equivalent to that of commercial filter cloths made of e.g. needle felt or tangled fiber fleece. Experiments with a suspension discharging out of the final purification after a biological stage with phosphate elimination has shown that this suspension with a solid content of e.g. 20 mg/l could be purified in the inlet of the filter up to a maximum residual solid content of 4 mg/l in the filtrate. With this the filter cloth in accordance with the invention is excellently suited for maintaining the legal provisions for phosphate elimination in the third purification stage of a waste water purification unit.

Because of the effective back washing process the required amount of back washing liquid is very small. Experiments have shown that the amount of back washing liquid required for a perfectly satisfactory cleaning is only on the order of magnitude of 0.5% to max. 2% of the throughput of the liquid to be filtered.

As already mentioned, the filter cloth in accordance with the invention can be used in filtering devices of any design, e.g. filter presses, disk filters, drum filters, and the like. As a rule no design changes in the filtering devices are necessary for the use of the filter cloth in accordance with the invention, that is, the existing filtering machine can be re-equipped with the filter cloths in accordance with the invention.

Figure 4:
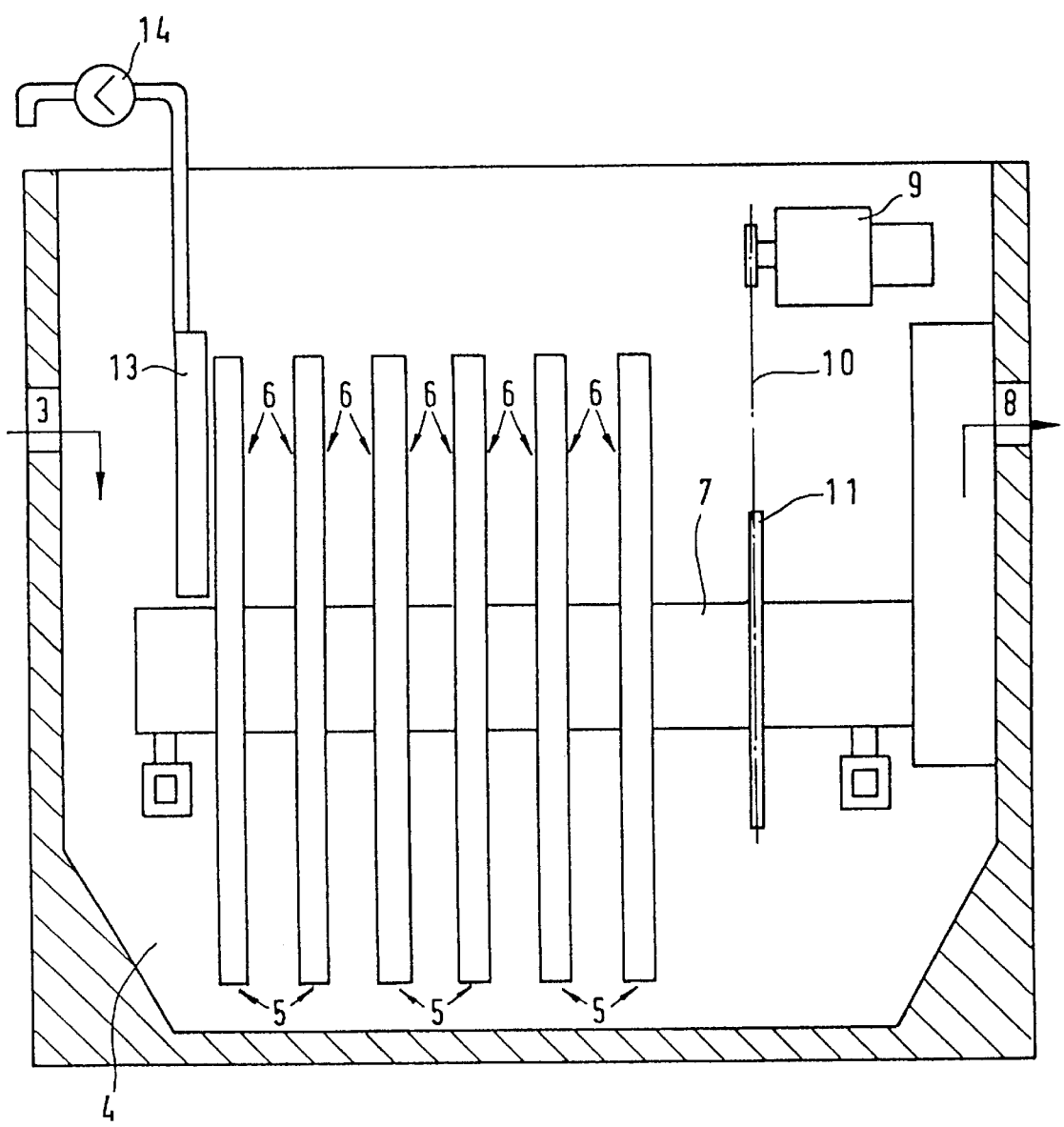
FIG. 4 shows a schematic longitudinal section of a filtering device made as a sieve filter.

A filtering device made as a disk filter is shown schematically in FIG. 4 as a specific embodiment. Preferably it can be used for purification of waste water which was pretreated biologically and then subjected to a chemical handling for precipitating out dissolved contaminants, e.g. phosphate. The pretreated waste water reaches a basin 4 via an inlet 3, in which basin there are a number of disk-shaped filter pieces 5, which in each case, are covered with filter cloths, on a rotating shaft 7. The water flows through the filter cloths 6 into the interior of the disk-shaped filter pieces 5 and is removed to the drain 8 via the rotating shaft 7. A motor 9 causes the rotation of the shaft 7 with disk-shaped filter pieces 5 via a chain 10 and a pinion 11. Each filter piece 5 consists of a carrying frame (not shown), which is covered with the filter cloth 6 so that the pile threads of the filter cloth lie on the outside of the disk-shaped filter piece 5. Each disk-shaped filter piece 5 also can be composed of several sectors, which in each case are covered with a sack-like filter cloth individually, as described in EP-B-0 413 178.

The back washing of the filter cloths 6 is performed by sucking liquid on the front side of each filter cloth 6, that is, on the outside of each disk-shaped filter piece 5. FIG. 4 schematically shows a suction bar 13, which stands opposite the first disk-shaped filter element separated by a short distance, and is connected to a suction device 14. The suction bar 13 has a slit-shaped opening turned toward the filter piece 5, and by turning the shaft 7 the filter element 5 is moved past the slit-shaped opening, so that gradually the entire surface thereof can be cleaned by back washing. If desired this back washing can be carried out continuously during the running filter operation, or with interrupted filter operation. If only one single suction bar 13 is provided, this must be portable with a suitable device in such a way that it can be brought one after the other into operating positions opposite each of the two faces of each of the disk-shaped filter pieces 5. Alternatively a number of stationary suction bars 13 can be provided, which in each case are associated with one of the two face sides of the individual disk-shaped filter elements 5.

Figure 5:
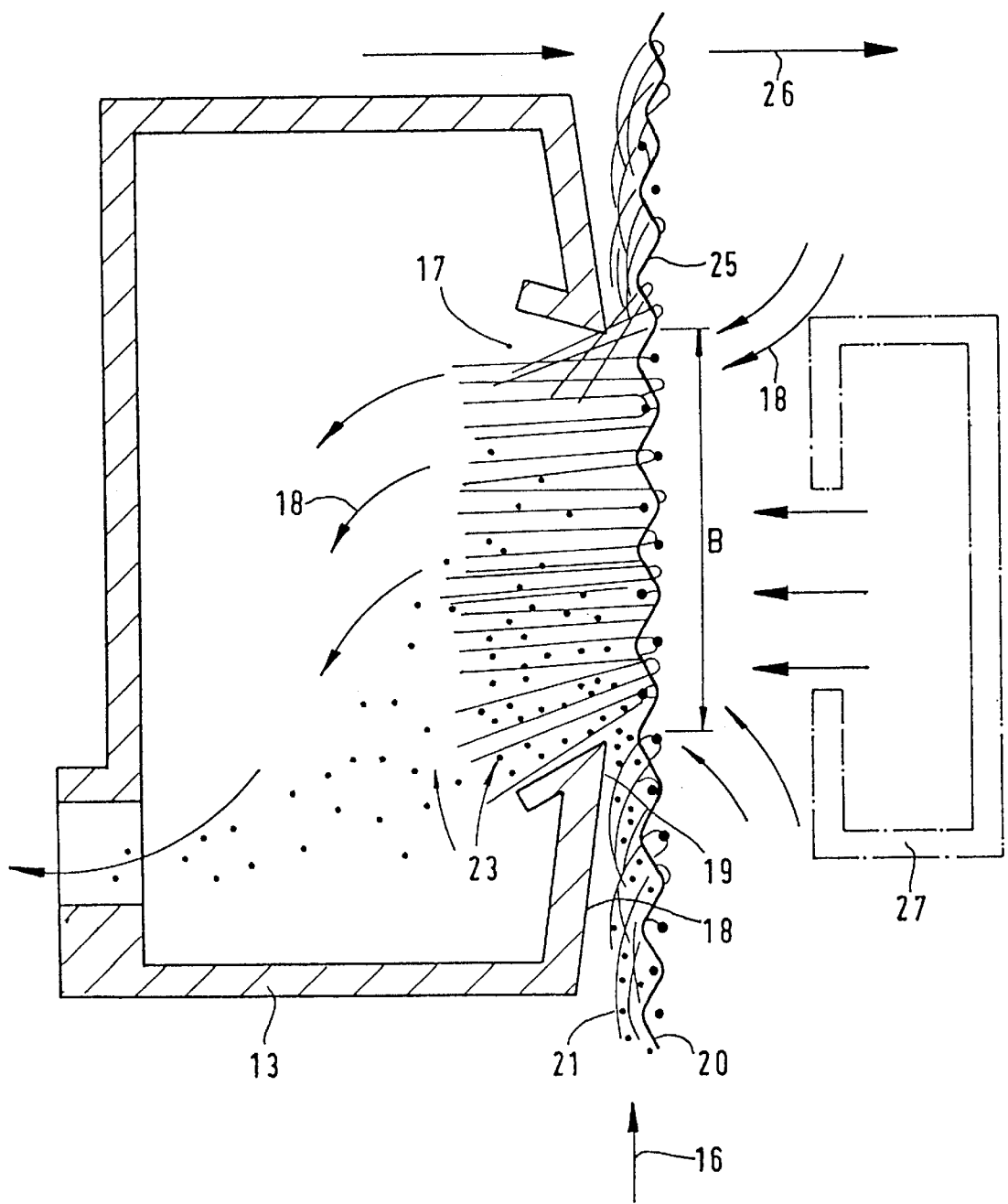
FIG. 5 shows a schematic detail of the filtering device in accordance with FIG. 4.

As indicated schematically in FIG. 5, one or the other of the suction bars 13 stands opposite the front side of the filter cloth 6 provided with the pile threads 21 at such a short distance that it acts mechanically on the pile threads at the same time. If it is assumed that the filter cloth 6 moves in the direction of the arrow 16 relative to the suction bar 13 (therefore upwardly in FIG. 5), the pile threads 21 one after the other reach the area of the suction slit 17 of the suction beam 13. Before the pile threads 21 reach the slit 17, they are prevented from straightening up by the lower area 18, shown in FIG. 5, of the wall of the suction bar facing toward them. As soon as the pile threads 21 reach the slit 17, they are straightened up abruptly by the flow 18 sucked through from the suction bar 13 through the filter cloth 6. A tapered or sharp-edged formation of the edge 19 of the suction slit 17 favors the abrupt straightening.

The mechanical action of the suction bar 13 on the pile threads 21 of the filter cloth 6 preferably should be such that the pile threads 21 reaching the area of the slit 17 at the time of the transition from the displaced state to the straightened state are spread apart, if possible up to the supporting fabric 20, that is, they are "parted". A profiling of the side of the suction bar 13 turned toward the filter cloth 6, in a given case with additional projections, can be easily determined by simple experiments. The trailing edge 25 of the suction slit 17 does not need to be sharp-edged but can e.g. also be rounded in order to favor a gentle displacement of cleaned pile threads. However, also conceivable are arrangements, in the case of which the filter cloth 6 is passed back and forth, e.g. in the pilger step, on the suction bar 13; in this case a symmetrical configuration of the suction beam 13 to the center line of the suction slit 17 is advantageous.

The back washing by suction can be supported by additional supply of back washing liquid and pressure from the back side of the filter cloth. If the construction of the filtering device permits this (in the case of the disk filter in accordance with FIG. 4 this ought not be the case), then a spraying bar 27 is located on the back side of the filter cloth 6 and is moved together with the suction bar 13, which creates a back washing jet directed to the back side of the filter cloth through a slit opening or a number of individual openings. This would be conceivable e.g. in the case of drum filters, in which case the spray bars 27 can be located fixed in the interior and the suction bar 13 on the outside of a turning drum, with the drum covered with the filter cloth 6.

The back washing process can be supported by additional measures known in the art. For example, the back washing liquid (fresh water or filtrate) also can be sucked in order to loosen encrusted dirt particles. In order to prevent an undesirable holding of dirt particles because of static charging, the threads of the filter cloth, but at least pile threads thereof, can be provided with known anti-static measures, e.g. by means of metal coating, depositing of conducting metal or carbon particle or chemical anti-static treatment.

As mentioned initially, the invention is applicable in the case of filtering devices of any design. According to the type of the filtering process, the means for creating the necessary relative motion between the suction bar and the filter cloth are developed in the direction of motion parallel to the filter cloth. This can take place not only as in the case of the embodiment described, by motion of the filter cloth with a stationary suction bar, but also by motion of the suction bar.

What is claimed is:

1. A process for filtering liquid, comprising the steps of:

a. guiding a flow of liquid to be filtered through a filter cloth having a supporting fabric (20) and a pile made of pile threads (21) on the side against which the liquid flows; said flow of liquid causing the pile threads (21) to be flattened toward the supporting fabric (20) and to form a spacial filter having angled and multiply curved flow channels;

b. back washing the filter cloth at time intervals by moving a suction bar (13) having a suction slit (17) over said filter cloth on the pile thread side thereof and causing the suction bar to exert a suction force to create a back washing flow by sucking the liquid through the filter cloth; said back washing flow causing the pile threads (21) in the area of the suction slit (17) to be straightened up to a position directed away from the supporting fabric (20);

c. subjecting said pile threads (21), prior to entering the suction slit, to a mechanical retaining action which retains the pile threads (21) in their flattened position against the fabric and prevents them from straightening up; and d. abruptly releasing the pile threads (21) from said mechanical retaining action upon partial entry thereof into the suction slit whereby the pile threads (21) are caused to straighten abruptly within the suction slit.

2. The process of claim 1, wherein the width of the suction slit is a multiple of the length of the pile threads (21).

3. The process of claim 1, comprising the further step of subjecting the pile threads (21) leaving a suction slit to a mechanical flattening action to return the pile threads (21) to their flattened position as they leave the suction slit.

4. A device for filtering liquid comprising a filter cloth located in the path of flow of the liquid to be filtered, the filter cloth having a support fabric and a pile made of pile threads (21) on its side exposed to the flow, the length, stiffness, and density of the pile threads being controlled so that they are flattened by the flow of the liquid being filtered and form a deep filter with angled and multiply curved flow channels, a suction bar (13) on the pile side of the filter cloth, with a suction slit (17) for sucking a back washing flow through the filter cloth at a flow rate such that in the back washing the pile threads straighten out into a position directed away from the filter cloth, and means for creating relative motion between the suction bar and the filter cloth (6) in a direction of motion parallel to the plane of the filter cloth, the suction bar (13) having a surface (18) turned toward the filter cloth (6) at least on the side of the suction slit (17) lying upstream with respect to the relative motion, which surface is spaced from the filter cloth (6) by such a short distance that it acts mechanically on the pile threads (21) prior to entering the suction slot to retain the pile threads in their flattened position against the fabric and abruptly release the pile threads upon entry into the suction slit.

5. The device of claim 4, wherein the surface (18) forms a sharp edge (19) on the edge of the suction slit (17).

6. The device of claim 4, wherein the width (3) of the suction slit (17) is greater than the length of the pile threads (21).

7. The device of claim 6, wherein the width (8) of the suction slit (17) amounts to a multiple of the length of the pile threads (21).

8. The device of claim 4, wherein the pile threads (21) consist of multifilaments with free ends separated into individual filaments.

* * * * *